(No Model.)
H. R. ALLEN
CLUTCH.
No. 262,553. Patented Aug. 15, 1882.
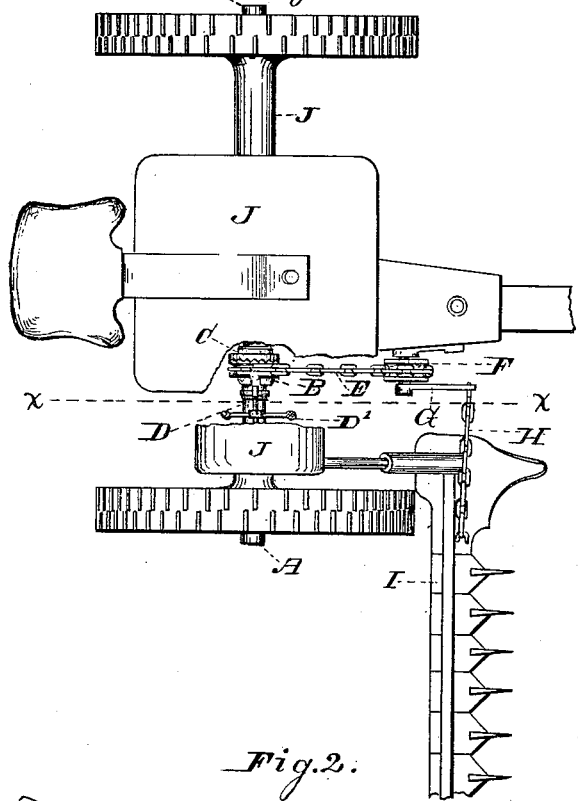
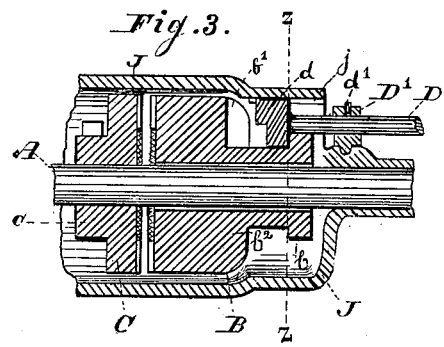
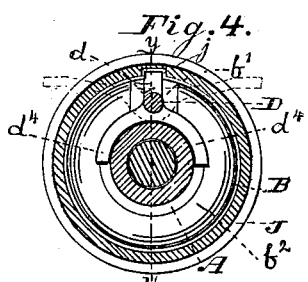
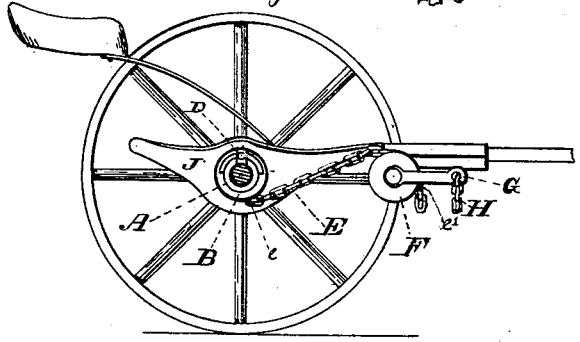
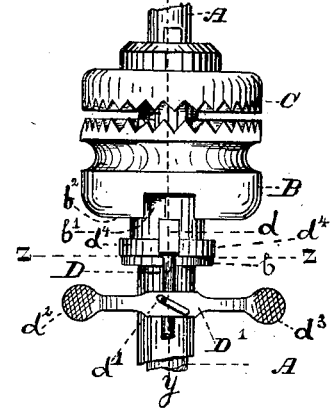
WITNESSES.
Jacob W. Loeper.
Chas. L. Thurber.
INVENTOR.
Horace R. Allen,
PER
C. Bradford,
ATTORNEY
N. PETERS, Photo-Lithographer, Washington, D. C.

UNITED STATES PATENT OFFICE.

HORACE R. ALLEN, OF INDIANAPOLIS, INDIANA.

CLUTCH.

SPECIFICATION forming part of Letters Patent No. 262,553, dated August 15, 1882.

Application filed December 27, 1881. (No model.)

*To all whom it may concern:*

Be it known that I, HORACE R. ALLEN, of the city of Indianapolis, county of Marion, and State of Indiana, have invented certain new and useful Improvements in Clutches, of which the following is a specification.

My said invention consists of an improved form of clutch for use in driving-wheels, pulleys, &c., on shafts or axles, as will be hereinafter more particularly described.

For the purpose of illustrating said invention practically it is shown and described in connection with a cutter-bar lifter for mowing and reaping machines, to the operating of which it is particularly well adapted.

Referring to the accompanying drawings, which are made a part hereof, and on which similar letters of reference indicate similar parts, Figure 1 is a top or plan view of a mowing-machine provided with my invention; Fig. 2, a view looking toward the center of the machine from the dotted line $x\ x$; Fig. 3, a central vertical section of the clutch, pulley, axle, latch-bolt, foot-lever, and the casing surrounding them, on the dotted line $y\ y$; Fig. 4, a transverse section as seen from the dotted line $y\ y$, the relative position of the foot-lever to the other parts being indicated by dotted lines; and Fig. 5, a top or plan view of the parts shown in Fig. 3, except the casing which is removed, except that portion which sustains the foot-lever.

In said drawings, the portions marked A represent the axle of the machine; B, a sheave or pulley running loosely thereon, one side of which is formed to constitute one part of a clutch and the other of which is formed, as hereinafter specified, to engage under certain circumstances with a latch-bolt, and to be operated by said bolt under other circumstances to engage with the other portion of the clutch; C, a disk secured rigidly to the axle, and formed upon one side with notches or projections to operate as the other clutch part; D, a latch-bolt mounted alongside said sheave or pulley on the axle-casing or other convenient part, and which serves to engage with said sheave or pulley and operate it or hold it in stationary position; D′, a foot-lever for operating said bolt; E, a belt or chain running from the sheave or pulley B to another pulley; F, said last-mentioned pulley, which is mounted on a shaft running parallel with the axle, but so far from it as to be nearly above the heel of the cutter-bar; G, an arm on said pulley; H, a chain or rod connecting said arm with the cutter-bar I, and J a casing which incloses the axle and the mechanism mounted thereon.

The operation of all the parts except the clutch and its operating mechanism is easily understood from the accompanying drawings and the foregoing brief description, as they are plain and simple. The clutch and those parts immediately related thereto will now be more fully described.

The sheave or pulley B has a series of notches or serrations upon one side, and the fixedly-mounted disk C has a corresponding series of serrations or other projections, into which, when the sheave or pulley B is brought into close relation with said disk, the serrations on said pulley fit, thereby causing said pulley to revolve with said disk and with the axle. Upon the other side of said pulley a hub is formed, upon the extreme end of which is formed a flange or rim, $b$, and in the larger part of which is cut a notch, $b'$.

The latch-bolt D is provided with a head, $d$, which engages with the rim $b$, as shown most plainly in Fig. 3, and operates between it and the larger parts of the hub to force said sheave or pulley back and forth. Said latch-bolt is so mounted by means of a projecting pin, $d'$, in its upper side and a diagonal slot in the foot-lever D′, or an equivalent diagonal groove and rib, as to work back and forth when said lever is partially rotated. When, therefore, said lever is rotated in one direction, by pressing down the end $d^2$ it advances, its head bearing against the larger part $b^2$ of the hub of the pulley, and forces said pulley into engagement with the disk and causes it to rotate until it reaches a position where the notch $b'$ in the hub comes opposite the head of said bolt, when (the notches or serrations being at an angle, as shown) said pulley becomes automatically disengaged and forced back from the disk, whereby the head of the bolt is caused to enter the notch $b'$ and hold the pulley from turning in either direction. When it is desired to release the pulley the foot-lever is rotated in the reverse direction by pressing down the end $d^3$, and the lock-bolt is thus withdrawn from the notch $b'$ and the pulley is left free to rotate or remain stationary so far as either the lock-bolt or the disk is concerned, as shown in Figs. 3 and 5.

The object in constructing the clutch, pulley, and latch-bolt as specified, and in the peculiar manner of operating them, is to provide an automatic means of lifting and holding the cutter-bar without close attention on the part of the operator or any danger of stopping or or breaking the machine.

As will be readily understood, in order to secure accuracy of operation the chain or belt E must be firmly attached to the pulleys B and F at such points as will permit substantially one-half of a revolution of said pulleys, and no more, as at $e$ and $e'$. This being done, it is necessary that when such revolution is made the clutch be automatically disengaged, or a breakage or stoppage of the machine would occur. This is accomplished by having the notch $b'$ arranged to arrive opposite the head $d$ at exactly the proper moment. The serrations by which the two clutch parts are engaged being provided with faces which are adapted to repel each other when not forcibly held together, as shown, the fixed disk C drives off the loosely-mounted combined clutch and pulley B, thus forcing the notch $b'$ over the head $d$, thereby not only preventing the disastrous consequence of a further rotation of said pulley, but locking it so that it cannot recede from the position already attained. When it is desired to release it the end $d^3$ of the foot-lever is pressed down, thus, by means of the diagonal slot therein and the pin $d'$ in the lock-bolt, withdrawing said lock-bolt from engagement with the notch $b'$, whereby the parts are brought into the relative positions shown in Figs. 3 and 5, and the pulley B is then free to rotate in the reverse direction, which the weight of the cutter-bar causes it to do. When it is desired to raise the cutter-bar again the end $d^2$ of the foot-lever is pressed down, which forces the pulley B over into engagement with the disk C, and the operation which has been described is then repeated. The head $d$ is prevented from turning by having arms $d^4$, which partially encircle the small part of the hub of the pulley, and by having its upper edge extend up into a groove, $j$, in the casing J. This mechanism can as well be applied to the pulley F with some obvious modifications, and in like manner might be applied to a construction wherein the disk C should be moved instead of the pulley. I regard the form shown, however, as perhaps the most convenient and reliable.

Having thus fully described my said invention, what I claim as new, and desire to secure by Letters Patent, is—

1. The combination of the shaft or axle, the rigidly-mounted disk thereon, having serrations or projections on its side, a loosely-mounted sheave or pulley on the same shaft or axle, having corresponding serrations or projections on the side next said disk and a hub on the other side smooth, except as to a circumferential groove and a notch therein, and a latch-bolt adapted to force said pulley into engagement with said disk, except when said notch arrives opposite its head, when it slips over, as specified, and engages with said head and is held thereby until said lock-bolt is withdrawn, whereby said pulley is made to revolve a determinate distance, and is then held in position until released, substantially as set forth.

2. The combination, with the clutch-pulley B, of the latch-bolt D, which engages therewith by means of its head, and is provided with a projecting pin on its upper side, which fits into a diagonal groove in the foot-lever whereby it is operated, whereby when said foot-lever is rotated said bolt is caused to force said pulley back or forth or release it from engagement, substantially as set forth.

3. The combination of the disk C, fixedly mounted upon the axle A, and having notches or serrations in one of its sides, the pulley B, loosely mounted upon the axle and having corresponding notches or serrations upon the side next said disk, and a rim, $b$, and face $b^2$ upon the other side, the latter having the notch $b'$ therein, and the latch-bolt D, having the head $d$, which is adapted, as specified, to engage with either said rim, said face, or said notch, all substantially as shown and described, and for the purposes specified.

In witness whereof I have hereunto set my hand and seal, at Indianapolis, Indiana, this 19th day of December, A. D. 1881.

HORACE R. ALLEN. [L. S.]

In presence of—
CHAS. L. THURBER,
C. BRADFORD.